United States Patent
Zhang et al.

(10) Patent No.: US 12,367,116 B2
(45) Date of Patent: Jul. 22, 2025

(54) DATA PROCESSING METHOD AND APPARATUS FOR DATA TRANSFER IN DISTRIBUTED STORAGE SYSTEM, DEVICE, AND STORAGE MEDIUM

(71) Applicant: Lenovo (Beijing) Limited, Beijing (CN)

(72) Inventors: Bin Zhang, Beijing (CN); Ming Lu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 140 days.

(21) Appl. No.: 18/183,627

(22) Filed: Mar. 14, 2023

(65) Prior Publication Data

US 2024/0004765 A1    Jan. 4, 2024

(30) Foreign Application Priority Data

Jun. 30, 2022  (CN) .......................... 202210776399.7

(51) Int. Cl.
*G06F 11/00* (2006.01)
*G06F 11/16* (2006.01)
*G06F 11/34* (2006.01)

(52) U.S. Cl.
CPC ...... *G06F 11/1662* (2013.01); *G06F 11/3419* (2013.01)

(58) Field of Classification Search
CPC ............. G06F 11/1662; G06F 11/3419; G06F 11/2094
See application file for complete search history.

(56) References Cited

U.S. PATENT DOCUMENTS 10,802,725 B2 * 10/2020 Krishnamurthy ..... G06F 3/0652
2021/0004162 A1 * 1/2021 Krishnamurthy ..... G06F 3/0659

* cited by examiner

*Primary Examiner* — Amine Riad
(74) *Attorney, Agent, or Firm* — ANOVA LAW GROUP

(57) ABSTRACT

A data processing method includes, based on a transfer control parameter corresponding to a storage location transfer event of distributed business data in a distributed storage system within a first time, predicting a first transfer control parameter usable by the distributed storage system within a second time for the transfer event, obtaining a second transfer control parameter that the distributed storage system is capable of providing within the second time in a case that the storage location transfer event does not occur, and controlling a transfer of the distributed business data within the second time based on the first transfer control parameter and the second transfer control parameter.

19 Claims, 9 Drawing Sheets

DATA PROCESSING METHOD AND APPARATUS FOR DATA TRANSFER IN DISTRIBUTED STORAGE SYSTEM, DEVICE, AND STORAGE MEDIUM

CROSS-REFERENCE TO RELATED APPLICATION

This application claims priority to Chinese Patent Application No. 202210776399.7, filed on Jun. 30, 2022, the entire content of which is incorporated herein by reference.

TECHNICAL FIELD

The present disclosure relates to the technical field of storage and, more particularly, to a data processing method and apparatus for a distributed storage system, a device, and a storage medium.

BACKGROUND

In related technologies, in a scheme of storing distributed business data in a storage system, data of the same business can be stored in different nodes of the storage system. If there is a faulty node in the storage system, business data stored therein needs to be redistributed to another node of the storage system. Redistribution of business data is equivalent to reading data that was originally stored in the faulty node and writing to another node. In the industry, a data read rate and a data write rate can be used as 10 capacity parameters of the storage system. If there is a faulty node, a large number of data reading and writing may be generated, which causes abnormalities of the 10 capacity parameters. The abnormalities may result in an avalanche effect, which not only causes the business that needs to be redistributed to fail to respond to external requests, but also causes data stored in other businesses stored in the storage system to be affected and cannot be accessed normally.

SUMMARY

In accordance with the disclosure, there is provided a data processing method including, based on a transfer control parameter corresponding to a storage location transfer event of distributed business data in a distributed storage system within a first time, predicting a first transfer control parameter usable by the distributed storage system within a second time for the transfer event, obtaining a second transfer control parameter that the distributed storage system is capable of providing within the second time in a case that the storage location transfer event does not occur, and controlling a transfer of the distributed business data within the second time based on the first transfer control parameter and the second transfer control parameter.

Also in accordance with the disclosure, there is provided an electronic device including at least one processor and a memory communicatively connected to the at least one processor and storing instructions that, when being executed by the at least one processor, cause the at least one processor to, based on a transfer control parameter corresponding to a storage location transfer event of distributed business data in a distributed storage system within a first time, predict a first transfer control parameter usable by the distributed storage system within a second time for the transfer event, obtain a second transfer control parameter that the distributed storage system is capable of providing within the second time in a case that the storage location transfer event does not occur, and control a transfer of the distributed business data within the second time based on the first transfer control parameter and the second transfer control parameter.

Also in accordance with the disclosure, there is provided a non-transitory computer readable storage medium storing instructions that, when executed by a computer, cause the computer to, based on a transfer control parameter corresponding to a storage location transfer event of distributed business data in a distributed storage system within a first time, predict a first transfer control parameter usable by the distributed storage system within a second time for the transfer event, obtain a second transfer control parameter that the distributed storage system is capable of providing within the second time in a case that the storage location transfer event does not occur, and control a transfer of the distributed business data within the second time based on the first transfer control parameter and the second transfer control parameter.

BRIEF DESCRIPTION OF THE DRAWINGS

With the detailed description below by reference to the accompanying drawings, the above-mentioned and other purposes, characteristics, and advantages of the example embodiments of the present disclosure will become easy to understand. In the accompanying drawings, some embodiments of the present disclosure are demonstrated as examples rather than restriction.

In the accompanying drawings, the same or corresponding label indicates the same or corresponding part.

DETAILED DESCRIPTION OF THE EMBODIMENTS

Figure 1:
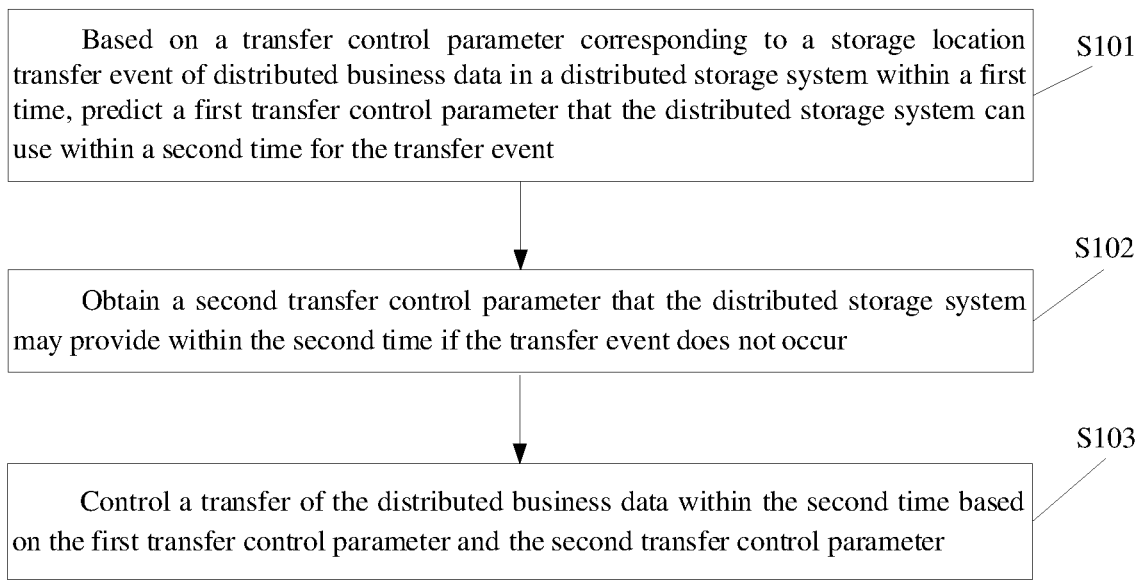
FIG. 1 shows an implementation flow chart of a data processing method for a distributed storage system according to an embodiment of the present disclosure.

In order to make the purposes, characteristics, and advantages of the present disclosure more obvious and easier to understand, the technical solutions in the embodiments of the present disclosure will be clearly described in detail below in combination with the accompanying drawings. Obviously, the described embodiments are only some rather than all embodiments of the present disclosure. Based on the embodiments of the present disclosure, all other embodiments obtained by those skilled in the art without creative work belong to the protection scope of the present disclosure.

In order to make the purposes, technical solutions, and advantages of the present disclosure clearer, the present disclosure will be further described in detail in combination with the accompanying drawings. The described embodiments should not be regarded as limitation of the present disclosure. All other embodiments obtained by those of ordinary skill in the art without creative work belong to the protection scope of the present disclosure.

In the following description, the term "some embodiments" describes the subsets of all possible embodiments, but "some embodiments" can be the same subset or different subsets of all possible embodiments, and can be combined with each other without conflict.

In the following description, the terms "first\second" are only used to distinguish similar objects, and does not represent a specific order for objects. "First\second" can be used with interchangeable specific order or sequence when permitted, so that the embodiments of the present disclosure described herein can be implemented in an order other than those illustrated or described herein.

Unless otherwise defined, all technical and scientific terms used herein have the same meaning as commonly understood by those of ordinary skill in the art to which the present disclosure belongs. The terms used herein are only for the purpose of describing the embodiments of the present disclosure, and are not intended to limit the present disclosure.

In various embodiments of the present disclosure, size of sequence numbers of each implementation process does not mean an execution order. The execution order of each process should be determined by functions and internal logic hereof, and should not constitute any limitation to the implementation of the embodiments of the present disclosure.

Before the embodiments of the present disclosure are further described in detail, nouns and terms involved in the embodiments of the present disclosure are described, which are applicable to the following explanations.

Distributed business data, referred to as business data for short, is business data in a distributed platform such as Elasticsearch (a search server based on Lucene) or Hadoop (a distributed system infrastructure).

Distributed storage system, referred to as a storage system for short, is a system that stores distributed business data (unless otherwise specified, distributed business is referred to as business for short in this specification). In a distributed platform, the same distributed storage system can store data of different businesses. When a certain business is executed, a business system in the distributed platform accesses the business data stored in the storage system to perform business functions.

Transfer control parameter. Redistribution of data originally stored in a faulty node of the storage system is actually to read data from the faulty node and write to another node, so as to realize normal business functions. This process can be regarded as a transfer event of storage location of the business data in the storage system. The data originally stored in the faulty node is transferred to another node for storage. In a scheme where the storage location is transferred, data will be read from the faulty node at a certain rate (read rate), and the read data will be written to another node at a certain rate (write rate).

In the technical solution of the present disclosure, during a transfer process of the storage location of the business data, it is needed to control the read rate and/or the write rate to avoid avalanche that may occur when there are a large number of reading and writing operations. A parameter that needs to be controlled during the transfer process, such as the read rate and/or the write rate, may be used as a transfer rate in the present disclosure, i.e., a transfer control parameter.

In the industry, a process of reading data from the faulty node at a certain rate (read rate) and writing the read data to another node at a certain rate (write rate) can be regarded as a data recovery process. Data recovery is to achieve normal access to the business data to realize normal business functions.

A Gini coefficient is a parameter to measure whether resources of the storage system are balanced. In an application scenario where the storage system is used to store business data of various businesses in the business system, accessing the business data stored in the storage system requires a certain read rate to read the data for access. When the business data is updated, it requires a certain write rate to write the updated data to the storage system. The read rate and write rate in these cases can be regarded as the resources of the storage system. Whether the resources of the storage system are balanced can be reflected by the Gini coefficient, which will be described in detail below.

In the technical solution of the present disclosure, a processing logic of a data processing method for a distributed storage system can be deployed on a distributed platform, and can also be deployed on any reasonable terminal or server. The terminal is a desktop computer, an all-in-one computer, a tablet computer, a mobile phone, or a smart wearable device. The server includes but is not limited to an ordinary server or a cloud server.

The present disclosure provides a data processing method for a distributed storage system. As shown in FIG. 1, the method includes the following processes.

S101, based on a transfer control parameter corresponding to a storage location transfer event of distributed business data in a distributed storage system within a first time, predicting a first transfer control parameter (also referred to as "first transfer control parameter value") that the distributed storage system can use within a second time for the transfer event.

In this process, both the first time and the second time are time information. The first time and the second time are time information with certain time lengths or time values. The time length can be a reasonable value in any one of seconds, minutes, hours, or days, such as several minutes, several hours, etc. The first time and the second time may be times such as 8:00 or 13:00.

On a time axis, the first time is a time earlier than the second time, and the second time is a time later than the first time. Based on the transfer control parameter corresponding to (used in) the storage location transfer event of the distributed business data in the distributed storage system at an earlier time, the transfer control parameter at a later time is predicted.

In this process, the storage location transfer event in which the business data is read from one node of the storage system and stored in another node occurs within the first time, or the storage location transfer event occurs earlier than the first time.

It is detected whether a storage location transfer event occurs in the storage system. Once a storage location transfer event is detected, the read rate and/or the write rate used during the transfer process can be detected to learn the transfer control parameter used within the first time. In the industry, detecting whether a storage location transfer event occurs in the storage system is detecting whether there is a data recovery action in the storage system. If there is a storage location transfer event, a large number of reading and writing operations will be generated in the storage system. The technical solution of the present disclosure is to avoid a problem of system avalanche caused by a large number of improper reading and writing operations.

In some application scenarios, the first time may be a time that has come and there is a storage location transfer event at this time, which is regarded as a historical time for convenience of description. The second time is a time that has not yet come, which may be regarded as a prediction time or a future time. A storage location transfer process takes a certain amount of time, and the transfer starts from a moment when the storage location transfer occurs. It is unknown whether the transfer ends at the second time, so a prediction is needed to avoid an avalanche effect in the future. Once a task of writing the business data stored in a faulty node to another node is completed, the transfer is considered to be completed.

The transfer control parameter corresponding to the storage location transfer event of the distributed business data in the distributed storage system within a certain historical time can be obtained by detecting the distributed storage system within the historical time, and can be automatically known.

The transfer control parameter corresponding to the storage location transfer event of the business data in the storage system can be understood as the read rate and/or write rate used in the storage system for the transfer event when the storage location transfer event occurs in the storage system. Generally speaking, the read rate and/or the write rate used in the storage system for the transfer event is, from a perspective of the storage system, the read rate and/or the write rate that the storage system needs to consume in order to cope with the transfer event. As such, this process is, based on the automatically learned transfer control parameter used in the storage system to cope with the transfer event in a certain historical time, the transfer control parameter that may be used in the storage system for the transfer event at a certain time in the future are predicted, i.e., the transfer control parameter that may be used in the storage system in order to cope with the transfer event at a certain time in the future are predicted.

S102, obtaining a second transfer control parameter (also referred to as "second transfer control parameter value") that the distributed storage system may provide within the second time if the transfer event does not occur.

In this process, when no storage location transfer event occurs in the storage system, it can be considered that the storage system is in a normal state and no faulty nodes are generated. As such, in this process, the transfer control parameter that the storage system may provide at a certain time in the future is obtained when the storage system is in a normal state. There is no strict sequence for S101 and S102, and they can also be performed at the same time.

Both the first transfer control parameter and the second transfer control parameter herein refer to the read rate and/or the write rate of the storage system. The first transfer control parameter is predicted read rate and/or write rate that the storage system may use at a certain time in the future in the transfer event. The second transfer control parameter is predicted transfer control parameter that the storage system may provide to an access party of the business data at the certain time in the future.

Generally speaking, as storage hardware, the storage system has predetermined reading and writing performances when leaving a factory, and the reading and writing performances may be reflected by the read rate and/or the write rate. The second transfer control parameter is the read rate and/or the write rate that the storage system may provide, such as to the access party of the business data, for the access party to access at a certain time in the future. In order to achieve normal access to the business data, usually the access party accesses the business data at a read rate and/or the write rate that is smaller than or equal to the rate provided by the storage system. The first transfer control parameter is the read rate and/or the write rate consumed by the storage system itself to cope with the transfer event.

The storage system stores a large amount of business data, and the access party will randomly access the business data stored in the storage system. Therefore, the read rate and/or the write rate that the storage system may provide at a certain time point is related to number of the access parties and access complexity at that time point.

Generally, at a same time point, the more the access parties, the smaller the read rate and/or the write rate the storage system may provide because each access party occupies certain storage resources. At the same time point, the fewer the access parties, the more unoccupied storage resources, and the more the read rate and/or the write rate the storage system may provide. That is, in the present disclosure, the read rate and/or the write rate that the storage system may provide vary according to actual usage conditions. At different times, due to different actual usage conditions, the transfer control parameter provided by the storage system may be different.

In some embodiments, a reasonable prediction algorithm, such as a time-series based machine learning, deep learning, or reinforcement learning model, can be used to predict the first transfer control parameter.

S103, controlling the transfer of the distributed business data within the second time based on the first transfer control parameter and the second transfer control parameter.

In this process, based on the predicted transfer control parameter that may be used at a certain time in the future and the obtained transfer control parameter that the storage system may provide at the certain time in the future, the transfer of the business data that will be transferred at the certain time in the future is controlled. For example, the transfer control parameter of the business data that will be transferred at the certain time in the future is controlled.

In S101-S103, based on the transfer control parameter corresponding to the storage location transfer event of the business data in the storage system in one period of time, the transfer control parameter that the storage system may use for the transfer event in another period of time is predicted. The transfer control parameter that the storage system may provide in another period of time when no transfer event occurs is obtained. Based on these two transfer control parameters, the transfer control of the business data is realized. Impacts of the transfer control parameter that the storage system may use for transfer event within a certain time (the second time) and the transfer control parameter that the storage system may provide within the certain time (the second time) on the transfer process are considered. The transfer of the business data within the certain time (the second time) is effectively and accurately controlled with using these two impact factors (the first and second transfer control parameters).

Generally speaking, in the scheme described above, when there are a large number of reading and writing operations in the storage system, the two transfer control parameters are used to control the read rate and/or the write rate reasonably, effectively, and accurately, so as to avoid the problem of system avalanche caused by a large number of improper reading and writing operations, and ensure normal access of business.

The scheme supports the prediction of the first transfer control parameter and the acquisition of the second transfer control parameter by cycles, and uses the two parameters to realize the transfer control. That is, according to the time axis, the scheme of S101-S103 can be executed at a certain time interval to realize the control of the entire transfer process, so that probability of the system avalanche can be reduced. In two adjacent cycles, the first time in a next cycle may be the same time as the second time in a previous cycle, and the first time in the next cycle and the second time in the previous cycle may also be separated by a period of time.

In the scheme where the first time in the next cycle is the same time as the second time in the previous cycle, in the next cycle, the transfer control parameter corresponding to the storage location transfer event of the business data in the storage system within the first time may be an actual transfer control parameter used by the storage system in the previous cycle to cope with the transfer event within the second time of the previous cycle, and the actual transfer control parameter can be obtained through actual detection.

In some embodiments, the scheme of controlling the transfer of the distributed business data within the second time based on the first transfer control parameter and the second transfer control parameter includes the following two cases.

Figure 2:
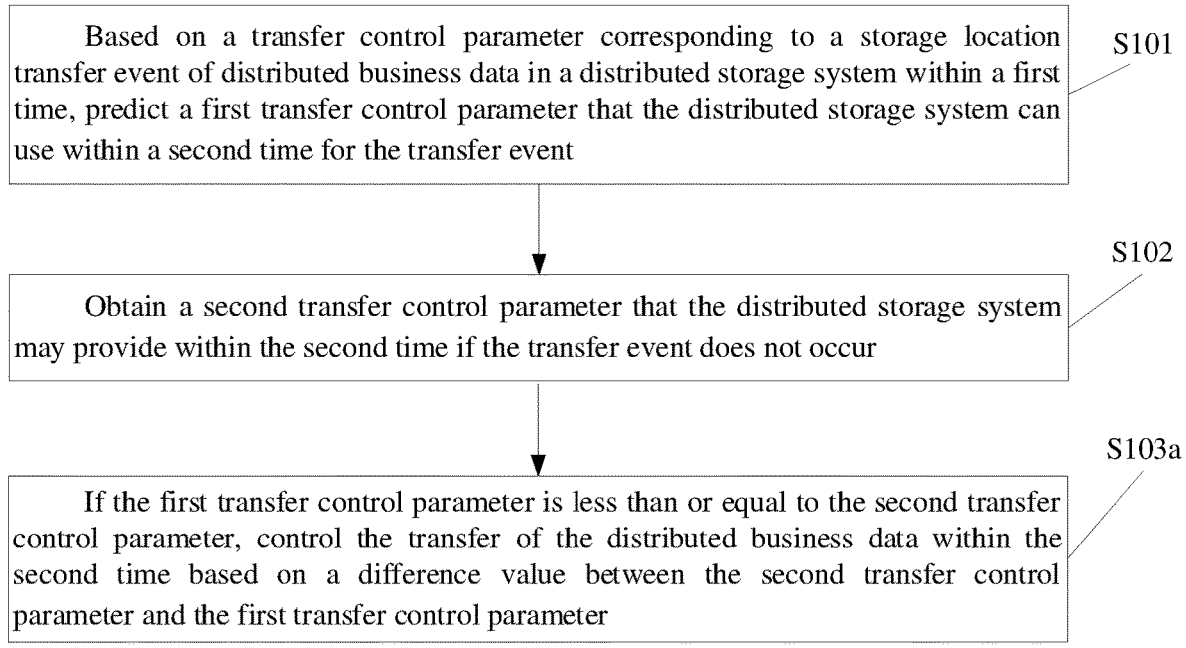
FIG. 2 shows another implementation flow chart of a data processing method for a distributed storage system according to an embodiment of the present disclosure.

In first case, as shown in FIG. 2, S103 becomes S103a. If the first transfer control parameter is smaller than or equal to the second transfer control parameter, the transfer of the distributed business data within the second time is controlled based on a difference value between the second transfer control parameter and the first transfer control parameter.

For example, the difference value between the second transfer control parameter and the first transfer control parameter is used as the transfer control parameter within the second time. Within the second time, a transfer rate of the business data within the second time is controlled according to the transfer control parameter.

In addition to controlling the read rate and/or the write rate reasonably, effectively, and accurately, the scheme described above is also simple, easy to operate, easy to implement in engineering, and highly practical.

In the present disclosure, because a server such as a business platform can be regarded as the access party that accesses the business data stored in the storage system, certain read and write rates are needed to access the storage system. As a consumer party, the storage system needs to use certain read and write rates to provide the access party with the data for the access of the business platform. Based on this, the technical solution of the present disclosure can not only control the transfer rate at business level for the business, but also control the transfer rate at storage level for the storage system.

The scheme shown in S103a is suitable for transfer rate control at the business level.

Figure 3:
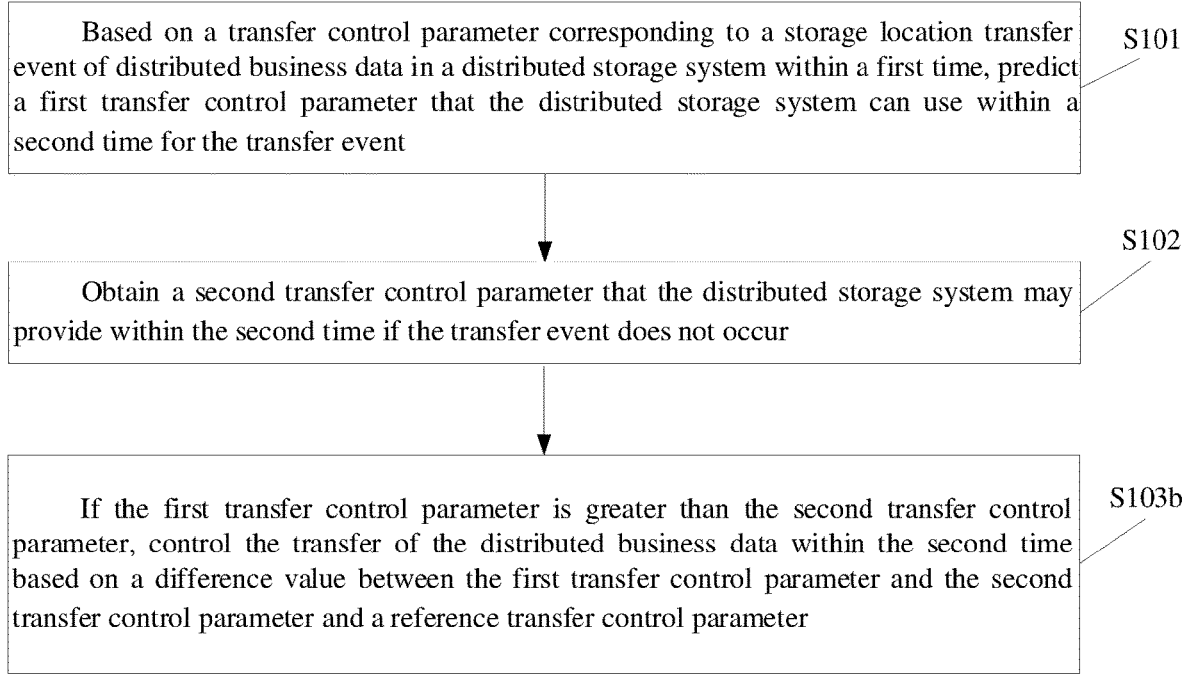
FIG. 3 shows another implementation flow chart of a data processing method for a distributed storage system according to an embodiment of the present disclosure.

In second case, as shown in FIG. 3, S103 becomes S103b. If the first transfer control parameter is greater than the second transfer control parameter, the transfer of the distributed business data within the second time is controlled based on a difference value between the first transfer control parameter and the second transfer control parameter and a reference transfer control parameter (also referred to as "reference transfer control parameter value").

The second transfer control parameter is a peak value of the transfer control parameter that the distributed storage system can provide within the second time if the transfer event does not occur. The reference transfer control parameter is a valley value of the transfer control parameter that the distributed storage system can provide within the second time if the transfer event does not occur.

In S103b, the second time is a time period, and the transfer control parameter within the time period is a parameter with numerical fluctuation. The transfer control parameter that the storage system can provide within the time period, i.e., the second transfer control parameter, can be approximately represented by a peak value of fluctuating values. A valley value of the fluctuating values can be used to represent the reference transfer control parameter. The difference value between the first transfer control parameter and the second transfer control parameter is added to the reference transfer control parameter to obtain an addition result. The addition result is used as the transfer control parameter used within the second time. Within the second time, the transfer rate of the business data within the second time is controlled according to the addition result.

In the scheme described above, it is considered that the transfer control parameter within the second time is a parameter with numerical fluctuation. The transfer rate of the business data within the second time is accurately and effectively controlled by using the peak and valley values of the fluctuating values and the first transfer control parameter.

The scheme shown in S103b is suitable for transfer rate control at the storage level.

The transfer rate control is to control the read and write rates, which can be generally understood as to limit the read and write rates. As such, the scheme shown in S103a is suitable for rate limit at the business level, and the scheme shown in S103b is suitable for rate limit at the storage level.

In some embodiments, the distributed storage system includes a plurality of storage modules. The storage module is any device capable of storing the business data, such as a magnetic disk, a hard disk, a flash memory, a U disk, etc. The storage location of the distributed business data in the distributed storage system is at least one storage module in the plurality of storage modules. For example, the business data of the same business may be stored in one or more storage devices in the storage system. If the storage location of the distributed business data changes, such as an event of transferring from an original storage device to another storage device, it is considered that a storage location transfer event occurs. If the storage location of the stored business data in the storage system does not change, it is considered that no storage location transfer event occurs.

Usually, in a distributed field, if a node such as a storage module fails in the storage system, a storage location transfer event occurs in the distributed platform in order to achieve normal access to the business. The business data stored in the faulty node can be saved through a transfer mechanism of the storage location. In addition to the storage location transfer event caused by node failure, if number of the nodes in the storage system changes, such as increasing or decreasing, the storage location transfer event will also occur because data needs to be redistributed among the nodes.

The following scheme is a scheme for determining whether a storage location transfer event occurs in the storage system. The scheme includes obtaining a target attribute of each storage module; grouping each storage module based on the target attribute of each storage module; determining whether the transfer event occurs in the distributed storage system based on a resource balance parameter of each group, and/or based on a reference quantity of each storage module in each group. The reference quantity is at least one of a reading capability parameter and a writing capability parameter of the storage module.

In the scheme described above, the target attribute of the storage module may be a reading and writing capability value of the storage module itself. The resource balance parameter may be a Gini coefficient. The reading capability parameter of the storage module may be the read rate, and the writing capability parameter of the storage module may be the write rate.

Figure 4:
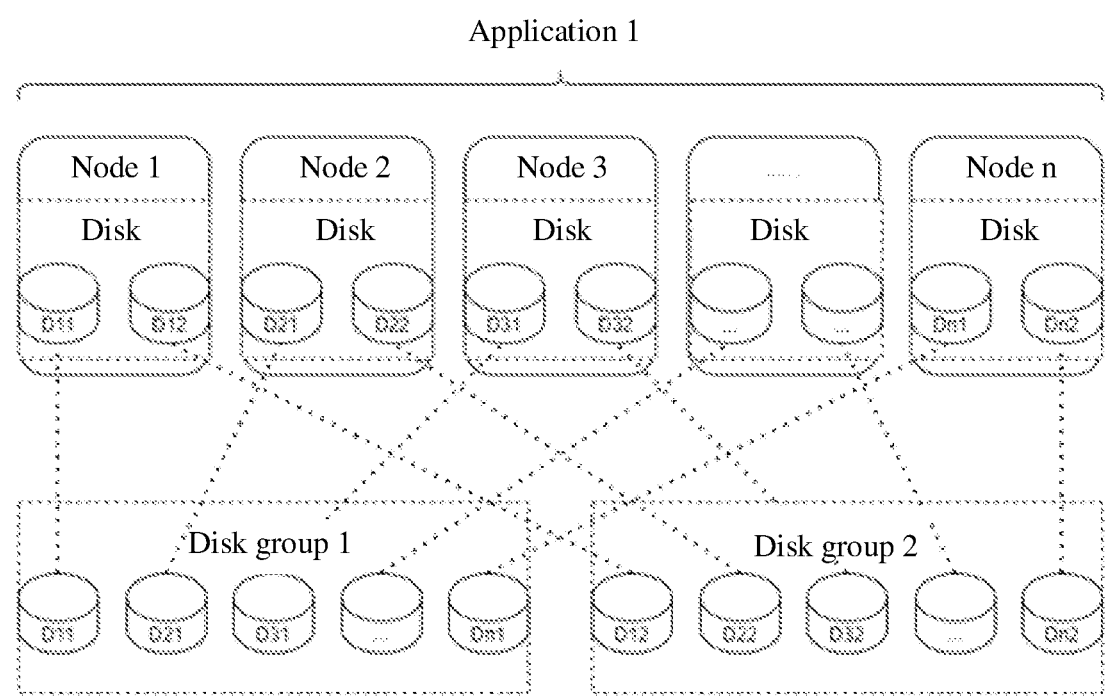
FIG. 4 shows a disk distribution diagram according to an embodiment of the present disclosure.

As shown in FIG. 4, nodes 1 to n in the storage system store the business data of a certain business such as application 1. In nodes 1 to n, each node includes two disks. The disks in all the nodes are grouped according to the reading and writing capability value of each disk. For example, the disks with the same or similar reading and writing capability values (differences of the reading and writing capability values are within a tolerable range) are divided into the same group. As such, all the storage modules can be divided into one or more groups. As shown in FIG. 4, all the disks are divided into two groups, which are disk group 1 and disk group 2. The reading and writing capabilities of the storage modules in the same group are consistent or have little difference.

The read rate and the write rate of each disk in each group are detected, and one of the read rate and the write rate of each disk in each group at a certain time is read. The Gini coefficient of each group at that time is calculated based on the read data. It is determined whether a transfer event occurs in the storage system based on the Gini coefficient of each group at that time.

A reading Gini coefficient of a disk group formed by the disks is calculated based on the read rate of each disk, and a writing Gini coefficient of a disk group formed by the disks is calculated based on the write rate of each disk. Referring to Table 1, it is determined whether a transfer event occurs based on the values of the reading Gini coefficient and the writing Gini coefficient.

As shown in Table 1, if the reading and/or writing Gini coefficients are both 0, it means that the read and write rates among the disks in the disk group are absolutely average, and no data recovery action occurs, i.e., no transfer event occurs. If the reading and/or writing Gini coefficients are both 0.2 (or 0.3), it means that the read and write rates among the disks in the disk group are relatively average (or relatively reasonable), and no data recovery action occurs at this time (indicated by N), i.e., no transfer event occurs.

If the reading and/or writing Gini coefficients are both 0.4 or 0.6, it means that the read and write rates among the disks in the disk group differ greatly, and a data recovery action occurs (indicated by Y), i.e., a transfer event occurs. The read and write rates differ greatly due to the storage location transfer of the business data among the disks.

TABLE 1

| Reading and/or writing Gini coefficients | Level | Is there a data recovery action? |
| --- | --- | --- |
| 0/0 | absolutely average | N |
| 0.2/0.2 | relatively average | N |
| 0.3/0.3 | relatively reasonable | N |
| 0.4/0.4 | differ largely | Y |
| 0.6/0.6 | differ significantly | Y |

In this scheme, in addition to the Gini coefficients to determine whether a transfer event occurs, an anomaly detection method such as a 3sigma model used in the industry can also be used to calculate the read rate and/or the write rate of each group. If the calculated read rate reaches a threshold set for the read rate, and/or the calculated write rate reaches a threshold set for the write rate, it is considered that a data recovery action occurs, i.e., a transfer event occurs. Otherwise, it is considered that no transfer event occurs.

In the storage system, whether a transfer event occurs can be detected at regular intervals, i.e., at a certain period of time. If a transfer event is found at a certain time, such as the first time, the actual transfer control parameter used by the storage system for the transfer event is detected. For example, the actual transfer control parameter used by the storage system during a period of time from the discovery of the transfer event to the end of the transfer event is detected. Therefore, the transfer control parameter within the prediction time can be predicted.

In some embodiments, the method consistent with the present disclosure further includes determining a first storage module and a second storage module where the storage location transfer event of the distributed data occurs from all the storage modules of the distributed storage system. Correspondingly, controlling the transfer of the distributed business data within the second time based on the first transfer control parameter and the second transfer control parameter includes controlling the transfer of the distributed business data in the first storage module and the second storage module within the second time based on the first transfer control parameter and the second transfer control parameter.

In the scheme described above, if it is determined that a transfer event occurs by using the Gini coefficients and/or the 3 sigma model, the Gini coefficients and/or the 3 sigma model can be used to identify the disk group where the transfer event occurs from all the disk groups in the storage system, as shown in the previous scheme. In the disk group where the transfer event occurs, the disk with the highest write rate is identified and used as a disk where the transfer event occurs in the disk group. For the convenience of description, the disk where the transfer event occurs is regarded as an abnormal disk.

In the scheme described above, not only the transfer event is identified, but also the disk where the transfer event occurs is identified based on an identification of the disk group where the transfer event occurs. A more granular identification of the storage module where the transfer event occurs is realized, so that an accurate rate limit at the storage level can be realized.

If a data recovery occurs, i.e., a transfer event occurs, data is usually read from multiple disks and restored (written) to one disk. The disk with the highest write rate is used as the second storage module (a writing storage module) in the storage location transfer event of the distributed data. A storage module that reads and writes the data to the writing storage module is used as the first storage module (a reading storage module) in the storage location transfer event of the distributed data.

Generally speaking, the transferred business data is stored in the first storage module before the transfer, and then read from the first storage module and written into the second storage module due to the node failure or node number change.

If the disk where the transfer event occurs is identified, a rate limit scheme at the storage level may be used to limit the rate of the storage system, as shown in S103b described above. For example, the rate of the disk group where the transfer event occurs can be limited, and the rate of the disk where the transfer event occurs can also be limited.

Based on this, the technical solution of the present disclosure can realize rate limit at the business level, and can also realize rate limit at the storage level. In the rate limit scheme at the storage level, the rate of the disk group where the transfer event occurs can be limited, and the rate of the disk where the transfer event occurs can also be limited at a more granular level. Therefore, an effective and accurate control of the read and write rates can be realized, and the avalanche can be avoided.

In some embodiments, obtaining the second transfer control parameter that the distributed storage system may provide within the second time if the transfer event does not occur includes obtaining the transfer control parameter provided by the distributed storage system within the historical time matching the second time if the transfer event does not occur in history based on historical data; using the transfer control parameter provided by the distributed storage system within the historical time matching the second time as the second transfer control parameter.

In the scheme described above, the historical time matching the second time may be a historical time corresponding to the second time. For example, if the second time is 17:00-20:00 on June 24, then the historical time matching the second time is 17:00-20:00 on any one or more days before June 24. The historical data is the read rate and/or the write rate that the storage system may provide to the access party in the history without a transfer event.

In some implementations, if a transfer event does not occur within the historical time, the transfer control parameter that the storage system may provide within the historical time matching the second time is obtained by detecting the actual transfer control parameters that the storage system may provide within the historical time matching the second time. A preset statistical algorithm is used to make statistics on the actual transfer control parameters that the storage system may provide within the historical time matching the second time, and a statistical result is used as the transfer control parameter that the storage system may provide within the second time if the transfer event does not occur.

For example, if the transfer event does not occur in the storage system on multiple days before June 24, the actual transfer control parameters that the storage system may provide during 17:00-20:00 on each of the multiple days before June 24 are detected. Based on a preset statistical method, the detected actual transfer control parameters that the storage system may provide during 17:00-20:00 on each of the multiple days before June 24 are counted to obtain the statistical result.

The statistical result may be a single value or a fluctuating value. In some embodiments, if it is a single value, it can be applied to S103$a$ to calculate a difference with the first transfer control parameter, so as to implement the scheme in S103$a$ and realize the rate limit at the business level. If it is a fluctuating value, it is also needed to know the peak value and the valley value of the fluctuating value, so as to implement the scheme in S103$b$ and realize the rate limit at the storage level.

The preset statistical algorithm may be a statistical method based on 95-peak, a statistical method based on standard deviation or variance, etc.

The second transfer control parameter is obtained based on the actual transfer control parameter that the storage system may provide if no transfer event occurs. As such, accuracy of the second transfer control parameter can be guaranteed, so that the storage system can effectively and accurately control the read and write rates for the transfer event.

The technical solution of the present disclosure will be further described below in conjunction with FIGS. 5-7.

The technical solution of the present application can be applied in two business scenarios. The first business scenario is that it cannot be directly learned whether there is a data recovery action from a business side. The second business scenario is that it can be learned whether there is a data recovery action from the business side. In the first business scenario, if there is a data recovery action, it is needed to limit the rate from a storage side to avoid the avalanche. This business scenario is a scenario where the rate is limited at the storage level, as shown in FIG. 6. In the second business scenario, since it can be learned whether there is a data recovery action from the business side, the rate can be directly limited from the business side to avoid the avalanche. This business scenario is a scenario where the rate is limited at the business level, as shown in FIG. 7.

Figure 6:
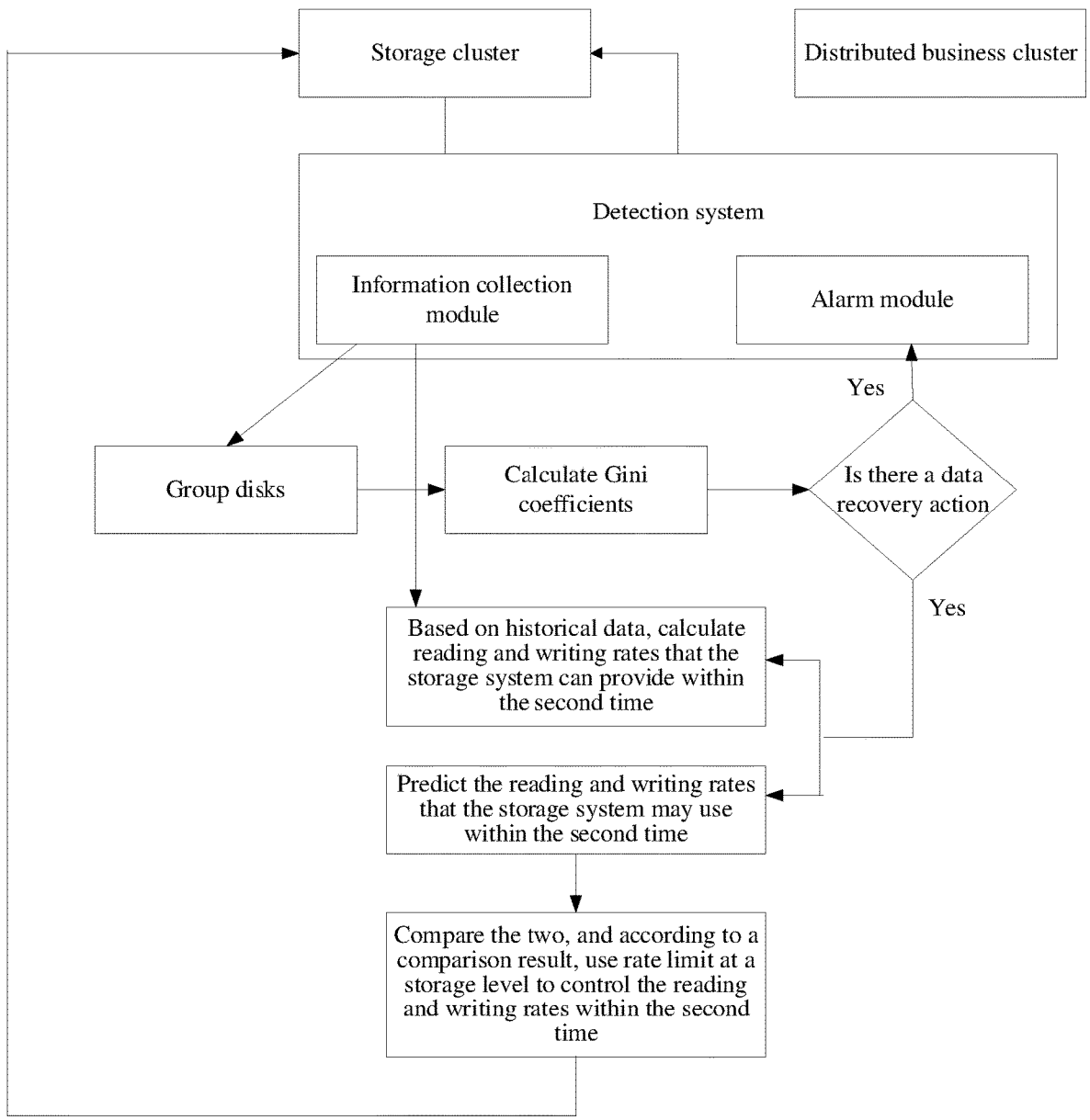
FIG. 6 shows a diagram of an application scenario according to an embodiment of the present disclosure.

For the scenario where the rate is limited at the storage level shown in FIG. 6, in this application scenario, the Gini coefficients of each group can be calculated in real time or every other time according to a grouping result of the nodes in the storage system. Based on calculation results of the Gini coefficients, it is realized whether a data recovery action occurs at a certain time or period. The 3sigma model can also be used to realize whether a data recovery action occurs in the storage system at a certain time or period. As for a specific calculation process, reference may be made to the above description, which will not be repeated herein.

For example, a calculation of whether a data recovery action occurs was performed at on Jun. 24, 2022, and it was found that a data recovery action occurred at this time. In order to avoid the avalanche effect due to the data recovery action, time after 15:00 on Jun. 24, 2022 can all be regarded as prediction time. The technical solution of the present disclosure may be performed every other time or in real time, so as to realize a reasonable control of the read and write rates within the prediction time to avoid the avalanche.

For example, the read and write rates in the future (can be flexibly set as needed) are predicted every few minutes (can be preset). At 15:20 on Jun. 24, 2022, the read and write rates at 15:30-16:00 on Jun. 24, 2022 (the second time or prediction time) were predicted. If it was learned that the data recovery action occurred, such as at 15:00, a detection system began to detect the actual read and write rates of the storage system under the data recovery action, so that the actual read and write rates of the storage system at time period of 15:00-15:20 (the first time) can be learned. The actual read and write rates of the storage system at 15:00-15:20 were input to a prediction model. Based on the actual read and write rates of the storage system within an arrival time, the read and write rates that the storage system may use at the prediction time such as 15:30-16:00 were predicted.

The prediction model is a time-series based machine learning, deep learning, or reinforcement learning model, which can realize a prediction of the read and write rates within a future time from the read and write rates within a historical time.

The actual read and write rates that the storage system used within a time period of if the data recovery action did not occur in the history of the storage system are used. If no data recovery occurred from June 01 to Jun. 23, 2022, the actual read and write rates that the storage system used in the time period of 15:30-16:00 in these days can be used as historical data. The data can be obtained by reading detection of the read and write rates of the storage system from the detection system. A statistical algorithm, such as a standard deviation algorithm, is used to calculate the historical data and obtain the peak value and valley value of the read and write rates that the storage system may provide within the time period of 15:30-16:00.

Figure 5:
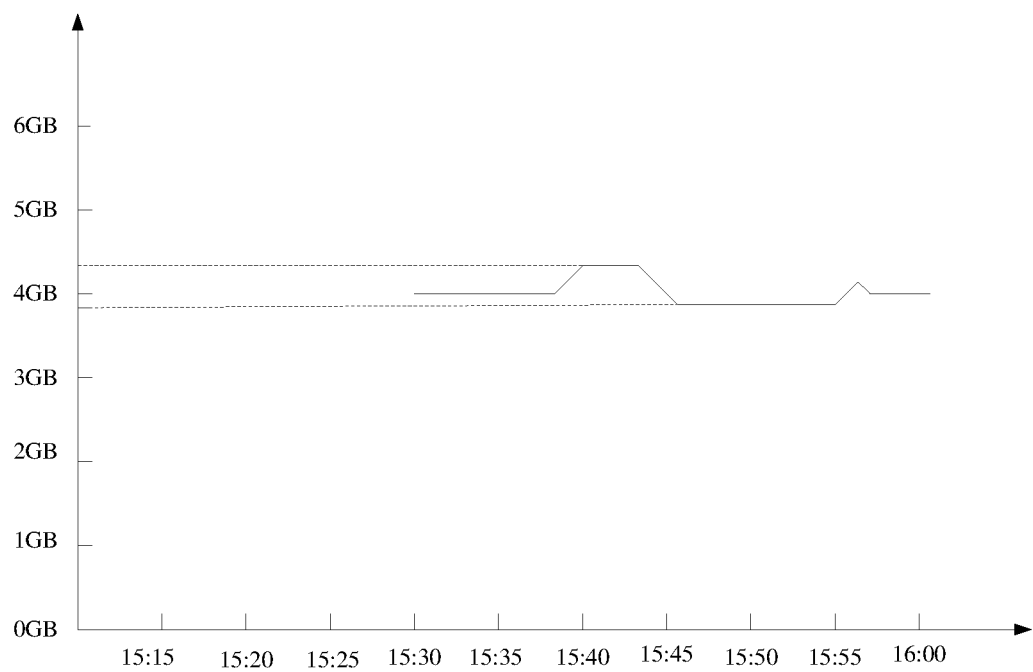
FIG. 5 shows a value volatility diagram according to an embodiment of the present disclosure.

In an example of the write rate as shown in FIG. 5, based on the historical data of the storage system, it is predicted that a peak value that the storage system may provide within 15:30-16:00 on Jun. 24, 2022 is 4.2 GB (gigabytes), and a valley value is 3.8 GB. The predicted peak value 4.2 GB of the write rate that may be provided minus the predicted write rate 4.4 GB that the storage system may use within 15:30-16:00 to obtain an absolute value. The predicted write rate 4.4 GB that the storage system may use within 15:30-16:00 may also minus the predicted peak value 4.2 GB of the write rate that may be provided, which is then added to the predicted valley value 3.8 GB, to obtain a rate limit value of 4 GB of the storage system that is needed at the storage level within the time period of 15:30-16:00. To avoid the avalanches within the time period of 15:30-16:00, the write rate of the storage system needs to be limited at 4 GB within the time period of 15:30-16:00.

In addition to the rate limit of the write rate within the time period of 15:30-16:00, the rate limit of the read rate is also needed. A process of the rate limit of the read rate is similar to that of the rate limit of the write rate, which will not be repeated herein.

The scenario shown in FIG. 6 is the first business scenario, so the rate limit scheme at the storage level can be used for rate limit. What is described above is an overall rate limit of the storage system. If the rate limit scheme at the storage level is performed, in addition to the overall rate limit of the storage system, the rate limit can be accurately performed on the disk, i.e., the disk where the data recovery occurs. The 3sigma model is used to identify the abnormal disk from the storage system, and the rate limit of the abnormal disk within the time period of 15:30-16:00 is 4 GB. As for an identification process of the abnormal disk, reference may be made to the above description, which will not be repeated herein.

The scheme described above is based on the first business scenario as an example. In the second business scenario, since it can be directly learned whether there is a data recovery action from the business side based on business status, there is no need to calculate whether there is a data recovery action. For example, if the business can be carried out normally, it is considered there is no data recovery action; if the business cannot be carried out normally, it is considered there is a data recovery action. If it is learned that there is a data recovery action from the business side, the detection system began to detect the actual read and write rates of the storage system under the data recovery action, so that the actual read and write rates of the storage system at the time period of 15:00-15:20 (the first time) can be learned. The actual read and write rates of the storage system at 15:00-15:20 were input to the prediction model, and the read and write rates that the storage system may use within the prediction time such as 15:30-16:00 were predicted, for example, to be 4.2 GB.

Based on the detected historical data, the statistical algorithm such as a 95-peak algorithm is used to calculate the historical data, and the read and write rates that the storage system may provide within the time period of 15:30-16:00 is obtained. For example, the read and write rates are 5 GB. The read and write rates of 5 GB that may be provided minus the predicted read and write rates of 4.2 GB that may be used within the time period of 15:30-16:00, to obtain a difference of 0.8 GB. At the time of the time period of 15:30-16:00, the rate limit was performed from the business side. Data recovery traffic used by the business side was controlled to be 0.8 GB, so that the data recovery traffic on the business side is limited to be 0.8 GB to avoid the avalanche.

The technical solution of the present disclosure is suitable for the rate limit at the business level or the rate limit at the storage level. A reasonable rate limit at the business level or the storage level can avoid the avalanche in a data recovery scenario, so that a certain business with data recovery does not affect the normal progress of other businesses.

Figure 7:
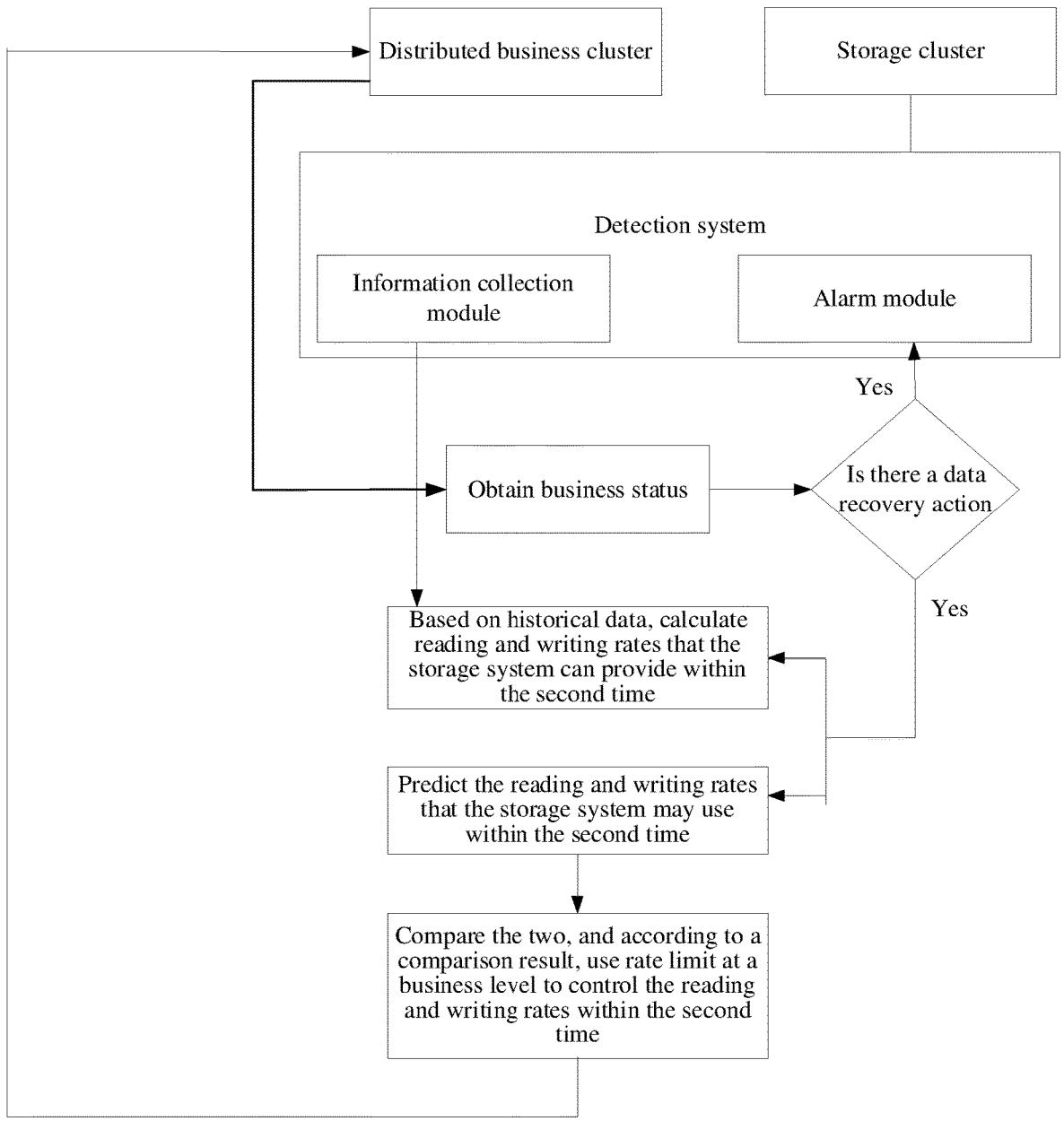
FIG. 7 shows a diagram of another application scenario according to an embodiment of the present disclosure.

In the scenarios shown in FIGS. 6 and 7, the distributed platform includes a cluster system, the business system, the detection system, etc. A processing logic of the embodiments of the present disclosure can be deployed in the detection system or another reasonable system in the distributed platform. In the distributed platform, the storage system and the business system can be the cluster system for providing a large amount of storage and cluster business functions. A distributed business cluster includes but is not limited to a big data environment, a distributed application, a traditional database cluster, etc.

In the storage system, an information collection module in the detection system can be used to sample or collect the storage data for the storage system. The prediction and acquisition in the embodiments of the present disclosure can be achieved based on the actual read and write rates and the historical data of the storage system collected by the information collection module within the first time.

For example, based on the historical data collected by the information collection module, the read and write rates that the storage system may provide within the prediction time can be counted or calculated if there is no data recovery action. Based on the actual read and write rates of the storage system collected by the information collection module if there is a data recovery action, the read and write rates used by the storage system within the prediction time are predicted.

An alarm module in the detection system is used to generate alerts if a data recovery action is identified, i.e., a storage location transfer event occurs, so as to remind relevant personnel to deal with it in time to avoid the avalanche of the storage system.

In the scheme described above, if there are a large number of reading and writing operations in the storage system, the predicted read and write rates that the storage system may use within a certain prediction time or time period and the read and write rates that the storage system may provide within the time matching the prediction time or time period without a large number of reading and writing operations are used, so as to reasonably, effectively, and accurately control the read and write rates of the storage system within the prediction time or time period to avoid the system avalanche caused by a large number of improper reading and writing operations, and ensure the normal access of business.

The scenario shown in FIG. 6 is the rate limit at the storage level, and the rate limit is directly performed on a disk side to avoid the avalanche if there are a large number of reading and writing operations on the disk. This rate limit scheme is relatively straightforward. The scenario shown in FIG. 7 is the rate limit at the business level. If a service such as an application provides a rate limit interface, it is equivalent to the rate limit on an application side. This scheme can realize the rate limit in time.

Figure 8:
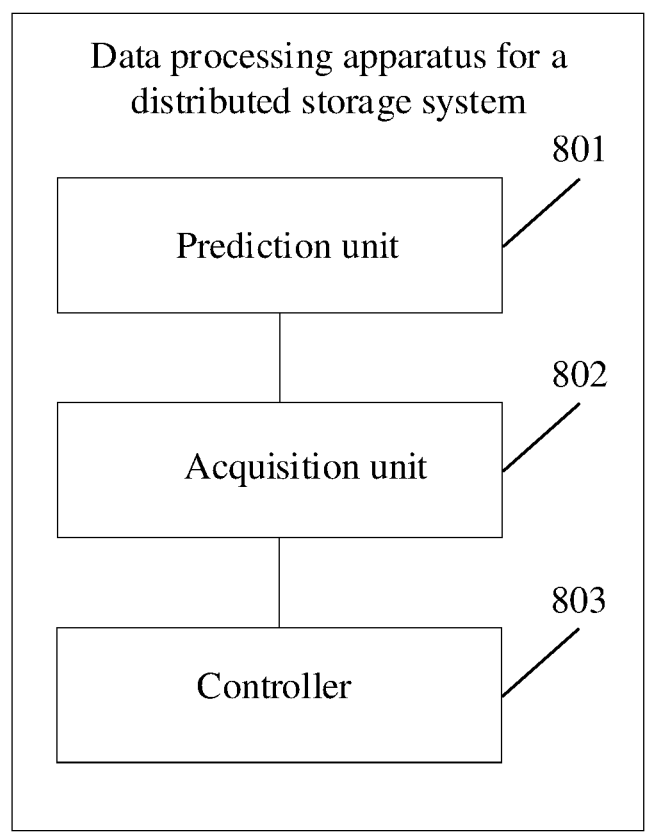
FIG. 8 shows a composition structural diagram of a data processing apparatus for a distributed storage system according to an embodiment of the present disclosure.

The present disclosure provides a data processing apparatus for a distributed storage system. As shown in FIG. 8, the apparatus includes a prediction unit 801, an acquisition unit 802, and a controller 803. The prediction unit 801 is configured to predict the first transfer control parameter that the distributed storage system can use within the second time for the transfer event based on the transfer control parameter corresponding to the storage location transfer event of the distributed business data in the distributed storage system within the first time. The acquisition unit 802 is configured to obtain the second transfer control parameter that the distributed storage system may provide within the second time if the transfer event does not occur. The controller 803 is configured to control the transfer of the distributed business data within the second time based on the first transfer control parameter and the second transfer control parameter.

In some embodiments, the controller 803 is configured to, if the first transfer control parameter is smaller than or equal to the second transfer control parameter, control the transfer of the distributed business data within the second time based on the difference value between the second transfer control parameter and the first transfer control parameter; and/or, if the first transfer control parameter is greater than the second transfer control parameter, control the transfer of the distributed business data within the second time based on the difference value between the first transfer control parameter and the second transfer control parameter and the reference transfer control parameter.

The second transfer control parameter is the peak value of the transfer control parameter that the distributed storage system can provide within the second time if the transfer event does not occur. The reference transfer control parameter is the valley value of the transfer control parameter that the distributed storage system can provide within the second time if the transfer event does not occur.

In some embodiments, the acquisition unit 802 is configured to obtain the target attribute of each storage module; group each storage module based on the target attribute of each storage module; determine whether the transfer event occurs in the distributed storage system based on the resource balance parameter of each group, and/or based on the reference quantity of each storage module in each group. The reference quantity is at least one of the reading capability parameter and the writing capability parameter of the storage module.

In some embodiments, the acquisition unit 802 is configured to determine the first storage module and the second storage module where the storage location transfer event of the distributed data occurs from all the storage modules of the distributed storage system. Correspondingly, the controller 803 is configured to control the transfer of the distributed business data in the first storage module and the second storage module within the second time based on the first transfer control parameter and the second transfer control parameter.

In some embodiments, the acquisition unit 802 is configured to obtain the transfer control parameter provided by the distributed storage system within the historical time matching the second time if the transfer event does not occur in history based on the historical data; use the transfer control parameter provided by the distributed storage system within the historical time matching the second time as the second transfer control parameter.

A problem-solving principle of the data processing apparatus of the distributed storage system consistent with the present disclosure is similar to that of the data processing method of the distributed storage system described above. Therefore, as for an implementation process and implementation principle of the apparatus, reference may be made to the description of the implementation process and implementation principle of the method described above, which will not be repeated herein.

According to the embodiments of the present disclosure, the present disclosure also provides an electronic device and a readable storage medium.

Figure 9:
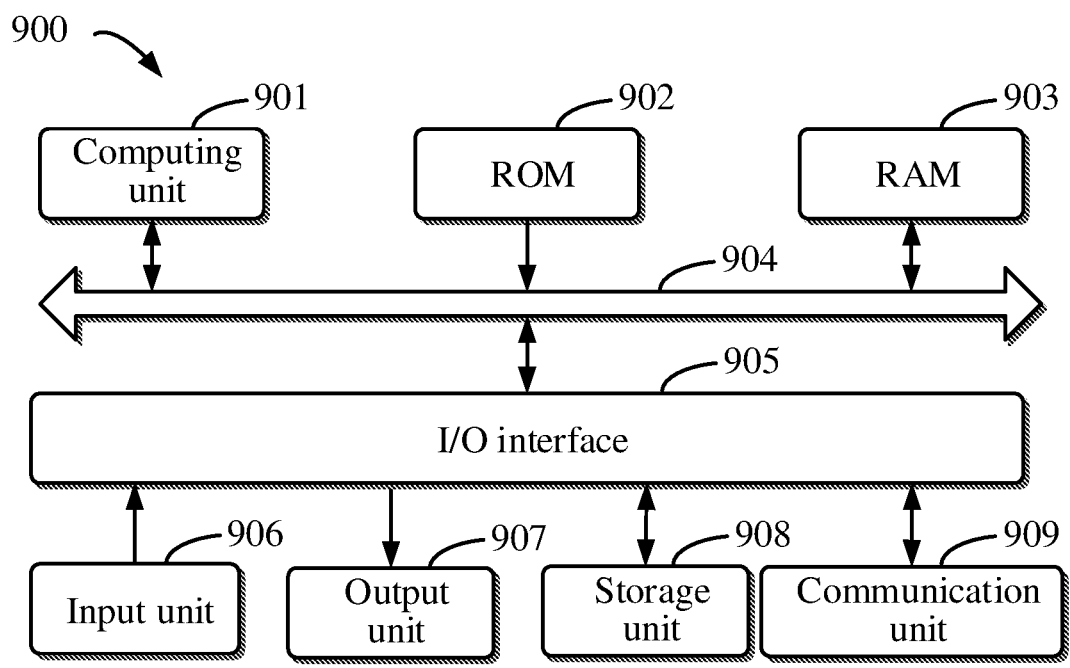
FIG. 9 shows a composition structural diagram of an electronic device according to an embodiment of the present disclosure.

FIG. 9 shows a schematic block diagram of an example electronic device 900 that may be used to implement the embodiments of the present disclosure. The electronic device is intended to represent various forms of digital computers, such as a laptop, a desktop, a workstation, a personal digital assistant, a server, a blade server, a mainframe, or another suitable computer. The electronic device may also represent various forms of mobile devices, such as a personal digital processing, a cellular telephone, a smart phone, a wearable device, or another similar computing device. The components shown herein, their connections and relationships, and their functions, are for illustration only, and are not intended to limit implementations of the present disclosure described and/or claimed herein.

As shown in FIG. 9, the device 900 includes a computing unit 901, which can perform various appropriate actions and processes according to computer programs stored in a read only memory (ROM) 902 or computer programs loaded from a storage unit 808 into a random access memory (RAM) 903. In the RAM 903, various programs and data needed for the operation of the device 800 can also be stored. The computing unit 901, ROM 902, and RAM 903 are connected to each other through a bus 804. An input/output (I/O) interface 905 is also connected to the bus 904.

Multiple components in the device 900 are connected to the I/O interface 905, which includes an input unit 906, such as a keyboard, a mouse, etc.; an output unit 907, such as various types of displays, speakers, etc.; the storage unit 908, such as a magnetic disk, an optical disk, etc.; and a communication unit 909, such as a network card, a modem, a wireless communication transceiver, etc. The communication unit 909 allows the device 900 to exchange information/data with another device via a computer network such as the Internet and/or various telecommunication networks.

The computing unit 901 may be various general-purpose and/or special-purpose processing components with processing and computing capabilities. Some examples of the computing unit 901 includes, but is not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and processes described above, such as the data processing method of the distributed storage system. For example, in some embodiments, the data processing method of the distributed storage system may be implemented as a computer software program tangibly embodied in a machine readable medium, such as the storage unit 808. In some embodiments, some or all of the computer program may be loaded and/or installed onto the device 900 via the ROM 902 and/or the communication unit 909. When the computer program is loaded into the RAM 903 and executed by the computing unit 901, one or more processes of the data processing method of the distributed storage system described above may be executed. In some other embodiments, the computing unit 901 may be configured in any other appropriate manner (for example, by means of firmware) to execute the data processing method of the distributed storage system.

Various implementations of the systems and techniques described above herein can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various embodiments may include being implemented in one or more computer programs executable and/or interpreted on a programmable system including at least one programmable processor. The programmable processor may be a special-purpose or general-purpose programmable processor, which can receive data and instructions from a storage system, at least one input device, and at least one output device, and transmit data and instructions to the storage system, the at least one input device, and the at least one output device.

In the context of the present disclosure, the machine readable medium may be a tangible medium that may include or store a program for use by or in conjunction with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, device, or any suitable combination thereof. More specific examples of the machine readable storage medium would include one or more wire-based electrical connections, a portable computer disk, a hard disk, a random access memory (RAM), a read only memory (ROM), an erasable programmable read only memory (EPROM or flash memory), a fiber optic, a compact disk read-only memory (CD-ROM), an optical storage device, a magnetic storage device, or any suitable combination thereof.

The above are only some embodiments of the present disclosure, but the protection scope of the present disclosure is not limited thereto. Those skilled in the art can easily think of changes or substitutions within the technical scope disclosed in the present disclosure, which should be covered within the scope of the present disclosure.

What is claimed is:

1. A data processing method comprising:
based on a transfer control parameter corresponding to a storage location transfer event of distributed business data in a distributed storage system within a first time, predicting a first transfer control parameter usable by the distributed storage system within a second time for the storage location transfer event;
obtaining a second transfer control parameter that the distributed storage system provides within the second time in a case that the storage location transfer event does not occur; and
controlling a transfer of the distributed business data within the second time based on the first transfer control parameter and the second transfer control parameter;
wherein:
the transfer control parameter is a read rate and/or write rate used in the storage system for the storage location transfer event when the storage location transfer event occurs in the storage system;
the first transfer control parameter is a predicted read rate and/or write rate that the storage system uses within the second time in the storage location transfer event; and
the second transfer control parameter is a predicted transfer control parameter that the storage system provides to an access party of the business data within the second time.

2. The method of claim 1, wherein controlling the transfer of the distributed business data within the second time based on the first transfer control parameter and the second transfer control parameter includes, in response to the first transfer control parameter being smaller than or equal to the second transfer control parameter, controlling the transfer of the distributed business data within the second time based on a difference value between the second transfer control parameter and the first transfer control parameter.

3. The method of claim 1, wherein:
controlling the transfer of the distributed business data within the second time based on the first transfer control parameter and the second transfer control parameter includes, in response to the first transfer control parameter being greater than the second transfer control parameter, controlling the transfer of the distributed business data within the second time based on:
a difference value between the first transfer control parameter and the second transfer control parameter, and
a reference transfer control parameter;
the second transfer control parameter is a peak value of the transfer control parameter that the distributed storage system provides within the second time in a case that the storage location transfer event does not occur; and
the reference transfer control parameter is a valley value of the transfer control parameter that the distributed storage system provides within the second time in the case that the storage location transfer event does not occur.

4. The method of claim 1,
wherein:
the distributed storage system includes a plurality of storage modules; and
storage location of the distributed business data in the distributed storage system includes at least one storage module of the plurality of the storage modules;
the method further comprising:
obtaining target attributes of the plurality of storage modules;
dividing the plurality of storage modules into groups based on the target attributes; and
determining whether the storage location transfer event occurs in the distributed storage system based on at least one of:
resource balance parameters of the groups, or
reference quantities of the plurality of storage modules, each of the reference quantities being at least one of a reading capability parameter or a writing capability parameter of a corresponding one of the plurality of storage modules.

5. The method of claim 1, further comprising:
determining, from all storage modules of the distributed storage system, a first storage module and a second storage module where the storage location transfer event of the distributed data occurs;
wherein controlling the transfer of the distributed business data within the second time based on the first transfer control parameter and the second transfer control parameter includes controlling a transfer of the distributed business data in the first storage module and the second storage module within the second time based on the first transfer control parameter and the second transfer control parameter.

6. The method of claim 1, wherein obtaining the second transfer control parameter that the distributed storage system provides within the second time in the case that the storage location transfer event does not occur includes:
   obtaining, based on historical data, the transfer control parameter provided by the distributed storage system within a historical time matching the second time in a case that the storage location transfer event does not occur in history; and
   using the transfer control parameter provided by the distributed storage system within the historical time matching the second time as the second transfer control parameter.

7. The method of claim 1, wherein:
   a first time in a next cycle is a same time as a second time in a previous cycle; and
   the transfer control parameter in the next cycle corresponding to the storage location transfer event of the business data in the storage system within the first time in the next cycle is an actual transfer control parameter used by the storage system in the previous cycle and obtained through actual detection.

8. An electronic device comprising:
   at least one processor; and
   a memory communicatively connected to the at least one processor and storing instructions that, when being executed by the at least one processor, cause the at least one processor to:
      based on a transfer control parameter corresponding to a storage location transfer event of distributed business data in a distributed storage system within a first time, predict a first transfer control parameter usable by the distributed storage system within a second time for the storage location transfer event;
      obtain a second transfer control parameter that the distributed storage system provides within the second time in a case that the storage location transfer event does not occur; and
      control a transfer of the distributed business data within the second time based on the first transfer control parameter and the second transfer control parameter;
   wherein:
      the transfer control parameter is a read rate and/or write rate used in the storage system for the storage location transfer event when the storage location transfer event occurs in the storage system;
      the first transfer control parameter is a predicted read rate and/or write rate that the storage system uses within the second time in the storage location transfer event; and
      the second transfer control parameter is a predicted transfer control parameter that the storage system provides to an access party of the business data within the second time.

9. The device of claim 8, wherein the instructions further cause the at least one processor to control the transfer of the distributed business data within the second time based on the first transfer control parameter and the second transfer control parameter by, in response to the first transfer control parameter being smaller than or equal to the second transfer control parameter, controlling the transfer of the distributed business data within the second time based on a difference value between the second transfer control parameter and the first transfer control parameter.

10. The device of claim 8, wherein:
    the instructions further cause the at least one processor to control the transfer of the distributed business data within the second time based on the first transfer control parameter and the second transfer control parameter by, in response to the first transfer control parameter being greater than the second transfer control parameter, controlling the transfer of the distributed business data within the second time based on:
       a difference value between the first transfer control parameter and the second transfer control parameter, and
       a reference transfer control parameter;
    the second transfer control parameter is a peak value of the transfer control parameter that the distributed storage system provides within the second time in a case that the storage location transfer event does not occur; and
    the reference transfer control parameter is a valley value of the transfer control parameter that the distributed storage system provides within the second time in the case that the storage location transfer event does not occur.

11. The device of claim 8, wherein:
    the distributed storage system includes a plurality of storage modules;
    storage location of the distributed business data in the distributed storage system includes at least one storage module of the plurality of the storage modules; and
    the instructions further cause the at least one processor to:
       obtain target attributes of the plurality of storage modules;
       divide the plurality of storage modules into groups based on the target attributes; and
       determine whether the storage location transfer event occurs in the distributed storage system based on at least one of:
          resource balance parameters of the groups, or
          reference quantities of the plurality of storage modules, each of the reference quantities being at least one of a reading capability parameter or a writing capability parameter of a corresponding one of the plurality of storage modules.

12. The device of claim 8, wherein
    the instructions further cause the at least one processor to determine, from all storage modules of the distributed storage system, a first storage module and a second storage module where the storage location transfer event of the distributed data occurs; and
    the instructions further cause the at least one processor to control the transfer of the distributed business data within the second time based on the first transfer control parameter and the second transfer control parameter by controlling a transfer of the distributed business data in the first storage module and the second storage module within the second time based on the first transfer control parameter and the second transfer control parameter.

13. The device of claim 8, wherein the instructions further cause the at least one processor to obtain the second transfer control parameter that the distributed storage system provides within the second time in the case that the storage location transfer event does not occur by:

obtaining, based on historical data, the transfer control parameter provided by the distributed storage system within a historical time matching the second time in a case that the storage location transfer event does not occur in history; and using the transfer control parameter provided by the distributed storage system within the historical time matching the second time as the second transfer control parameter.

14. A non-transitory computer readable storage medium storing instructions that, when executed by a computer, cause the computer to:

based on a transfer control parameter corresponding to a storage location transfer event of distributed business data in a distributed storage system within a first time, predict a first transfer control parameter usable by the distributed storage system within a second time for the storage location transfer event;

obtain a second transfer control parameter that the distributed storage system provides within the second time in a case that the storage location transfer event does not occur; and control a transfer of the distributed business data within the second time based on the first transfer control parameter and the second transfer control parameter;

wherein:

the transfer control parameter is a read rate and/or write rate used in the storage system for the storage location transfer event when the storage location transfer event occurs in the storage system;

the first transfer control parameter is a predicted read rate and/or write rate that the storage system uses within the second time in the storage location transfer event; and the second transfer control parameter is a predicted transfer control parameter that the storage system provides to an access party of the business data within the second time.

15. The non-transitory computer readable storage medium of claim 14, wherein the instructions further cause the computer to control the transfer of the distributed business data within the second time based on the first transfer control parameter and the second transfer control parameter by, in response to the first transfer control parameter being smaller than or equal to the second transfer control parameter, controlling the transfer of the distributed business data within the second time based on a difference value between the second transfer control parameter and the first transfer control parameter.

16. The non-transitory computer readable storage medium of claim 14, wherein:

the instructions further cause the computer to control the transfer of the distributed business data within the second time based on the first transfer control parameter and the second transfer control parameter by, in response to the first transfer control parameter being greater than the second transfer control parameter, controlling the transfer of the distributed business data within the second time based on:

a difference value between the first transfer control parameter and the second transfer control parameter, and a reference transfer control parameter;

the second transfer control parameter is a peak value of the transfer control parameter that the distributed storage system provides within the second time in a case that the storage location transfer event does not occur; and the reference transfer control parameter is a valley value of the transfer control parameter that the distributed storage system provides within the second time in the case that the storage location transfer event does not occur.

17. The non-transitory computer readable storage medium of claim 14, wherein:

the distributed storage system includes a plurality of storage modules;

storage location of the distributed business data in the distributed storage system includes at least one storage module of the plurality of the storage modules; and the instructions further cause the computer to:

obtain target attributes of the plurality of storage modules;

divide the plurality of storage modules into groups based on the target attributes; and determine whether the storage location transfer event occurs in the distributed storage system based on at least one of:

resource balance parameters of the groups, or reference quantities of the plurality of storage modules, each of the reference quantities being at least one of a reading capability parameter or a writing capability parameter of a corresponding one of the plurality of storage modules.

18. The non-transitory computer readable storage medium of claim 14, wherein the instructions further cause the computer to determine, from all storage modules of the distributed storage system, a first storage module and a second storage module where the storage location transfer event of the distributed data occurs; and the instructions further cause the computer to control the transfer of the distributed business data within the second time based on the first transfer control parameter and the second transfer control parameter by controlling a transfer of the distributed business data in the first storage module and the second storage module within the second time based on the first transfer control parameter and the second transfer control parameter.

19. The non-transitory computer readable storage medium of claim 14, wherein the instructions further cause the computer to obtain the second transfer control parameter that the distributed storage system provides within the second time in the case that the storage location transfer event does not occur by:

obtaining, based on historical data, the transfer control parameter provided by the distributed storage system within a historical time matching the second time in a case that the storage location transfer event does not occur in history; and using the transfer control parameter provided by the distributed storage system within the historical time matching the second time as the second transfer control parameter.

* * * * *